US012775722B2

(12) United States Patent
Guan et al.

(10) Patent No.: US 12,775,722 B2
(45) Date of Patent: Oct. 27, 2026

(54) DATA COMMUNICATION METHOD, MEMORY POOLING SWITCH DEVICE, CLOUD COMPUTING SYSTEM, AND STORAGE MEDIUM

(71) Applicant: Alibaba Innovation Private Limited, Singapore (SG)

(72) Inventors: Tianchan Guan, Shanghai (CN); Yijin Guan, Beijing (CN); Zhaoyang Du, Beijing (CN); Dimin Niu, Sunnyvale, CA (US)

(73) Assignee: Alibaba Innovation Private Limited, Singapore (SG)

( * ) Notice: Subject to any disclaimer, the term of this patent is extended or adjusted under 35 U.S.C. 154(b) by 0 days.

(21) Appl. No.: 18/812,988

(22) Filed: Aug. 22, 2024

(65) Prior Publication Data

US 2025/0068748 A1 Feb. 27, 2025

(30) Foreign Application Priority Data

Aug. 25, 2023 (CN) ........................ 202311084422.7

(51) Int. Cl.
*G06F 21/60* (2013.01)
*G06F 13/42* (2006.01)

(52) U.S. Cl.
CPC ............ *G06F 21/606* (2013.01); *G06F 13/42* (2013.01); *G06F 2213/40* (2013.01)

(58) Field of Classification Search
CPC .... G06F 21/606; G06F 13/42; G06F 2213/40; H04L 69/08; H04L 12/40; H04L 69/18
See application file for complete search history.

(56) References Cited

U.S. PATENT DOCUMENTS 7,075,919 B1 * 7/2006 Wendt ................. H04L 41/5054 370/352
8,392,565 B2 3/2013 Tripathi et al.
(Continued)

FOREIGN PATENT DOCUMENTS

CN 103905426 A 7/2014
CN 103905467 A 7/2014
(Continued)

OTHER PUBLICATIONS

First Office Action for Chinese Application No. 202311084422.7, mailed Mar. 10, 2026, 17 pages.
(Continued)

*Primary Examiner* — Michael Won
(74) *Attorney, Agent, or Firm* — Sheppard Mullin Richter & Hampton LLP

(57) ABSTRACT

The embodiments of the present invention provide a data communication method, a memory pooling switch device, a cloud computing system, and a storage medium. The data communication method comprises: converting verification preprocessed memory data from a receiver's communication protocol format to a sender's communication protocol format, wherein the receiver's communication protocol format and the sender's communication protocol format are used for asymmetric communication protocols on a communication bus between a server and a memory pooling switch device; performing verification processing on the verification preprocessed memory data to obtain a verification result; transmitting the verification result to the server via the communication bus in the sender's communication protocol format.

12 Claims, 3 Drawing Sheets

(56) References Cited

U.S. PATENT DOCUMENTS

| | | | | |
|---|---|---|---|---|
| 8,467,302 | B2 | 6/2013 | Wu et al. | |
| 8,572,382 | B2 | 10/2013 | De Lutiis et al. | |
| 8,731,587 | B2 | 5/2014 | Laumen et al. | |
| 9,838,829 | B2 | 12/2017 | El-Hoiydi | |
| 9,967,077 | B2 | 5/2018 | Weston et al. | |
| 10,172,179 | B2 | 1/2019 | Van Lieshout et al. | |
| 10,826,915 | B2 * | 11/2020 | Kawasaki | H04L 43/0876 |
| 10,996,764 | B1 * | 5/2021 | Kamada | H04W 12/68 |
| 11,567,803 | B2 | 1/2023 | Haywood et al. | |
| 11,763,140 | B2 | 9/2023 | Schwartz et al. | |
| 12,086,446 | B2 | 9/2024 | Sen et al. | |
| 12,373,377 | B2 * | 7/2025 | Hyatt | G06F 13/4221 |
| 2002/0051223 | A1 * | 5/2002 | Izumi | H04N 1/00204<br>358/402 |
| 2005/0223184 | A1 | 10/2005 | Russell et al. | |
| 2007/0101236 | A1 * | 5/2007 | Bauerle | G06F 11/1004<br>714/763 |
| 2010/0005212 | A1 * | 1/2010 | Gower | G06F 13/4234<br>710/308 |
| 2019/0042294 | A1 | 2/2019 | Guim Bernat et al. | |
| 2019/0182534 | A1 * | 6/2019 | Matsuoka | H04N 21/44 |
| 2024/0135447 | A1 * | 4/2024 | Kundu | G06Q 20/389 |
| 2025/0068748 | A1 * | 2/2025 | Guan | G06F 21/606 |
| 2025/0199711 | A1 * | 6/2025 | Saxena | G06F 3/0655 |

FOREIGN PATENT DOCUMENTS

| | | | |
|---|---|---|---|
| CN | 110582786 | A | 12/2019 |
| CN | 111158611 | A | 5/2020 |
| CN | 113645258 | A | 11/2021 |
| CN | 115168261 | A | 10/2022 |
| WO | 2008054165 | A1 | 5/2008 |
| WO | 2015062033 | A1 | 5/2015 |

OTHER PUBLICATIONS

Second Office Action for Chinese Application No. 202311084422.7 mailed on Jul. 17, 2026.

* cited by examiner

DATA COMMUNICATION METHOD, MEMORY POOLING SWITCH DEVICE, CLOUD COMPUTING SYSTEM, AND STORAGE MEDIUM

CROSS-REFERENCE TO RELATED APPLICATIONS

This application claims priority to Chinese Patent Application No. 202311084422.7, filed with the China National Intellectual Property Administration on Aug. 25, 2023, and entitled "Data Communication Method, Memory Pooling Switch Device, Cloud Computing System, and Storage Medium," which is incorporated herein by reference in its entirety.

TECHNICAL FIELD

The embodiments of the present invention relate to the field of computer technology, particularly to a data communication method, a memory pooling switch device, a cloud computing system, and a storage medium.

BACKGROUND

In a cloud computing system, virtualization technology can be used to configure at least one virtual machine within a server. Such a server can be referred to as a physical server or host. Different hosts are connected to a corresponding memory pooling switch device through a communication bus, and mesh device interconnection is utilized to achieve data interconnectivity between various servers.

Currently, data security in cloud computing systems is mostly implemented within servers. However, there is no reliable solution for ensuring data security during transmission between different servers.

SUMMARY

In view of this, the embodiments of the present invention provide a data communication method, a memory pooling switch device, a cloud computing system, and a storage medium, to at least partially solve the above-mentioned problems.

According to a first aspect of the embodiments of the present invention, a data communication method is provided, comprising: converting verification preprocessed memory data from a receiver's communication protocol format to a sender's communication protocol format, wherein the receiver's communication protocol format and the sender's communication protocol format are used for asymmetric communication protocols of a communication bus between a server and a memory pooling switch device; performing verification processing on the verification preprocessed memory data to obtain a verification result; transmitting the verification result to the server via the communication bus in the sender's communication protocol format.

In another implementation of the present invention, performing verification processing on the verification preprocessed memory data to obtain a verification result comprises: based on a verification protection level corresponding to a system execution phase of the server, performing verification processing on the verification preprocessed memory data to obtain the verification result.

In another implementation of the present invention, based on the memory data and the verification protection level corresponding to the system execution phase of the server, performing verification processing on the verification preprocessed memory data to obtain the verification result comprises: if the system execution phase of the server is in an initialization phase of the server, performing verification processing on the verification preprocessed memory data and using the obtained memory data as the verification result.

In another implementation of the present invention, based on the memory data and the verification protection level corresponding to the system execution phase of the server, performing verification processing on the verification preprocessed memory data to obtain the verification result comprises: if the system execution phase of the server is in a non-initialization phase of the server, performing verification processing on the verification preprocessed memory data. If the verification is successful, using the obtained memory data and its verification data as the verification result.

In another implementation of the present invention, based on the memory data and the verification protection level corresponding to the system execution phase of the server, performing verification processing on the verification preprocessed memory data to obtain the verification result further comprises: in the case that the verification fails, correcting the memory data based on the verification data; using the corrected memory data and the verification data as the verification result.

In another implementation of the present invention, the server's system execution phases includes an initialization phase and a non-initialization phase, wherein the verification protection level of the non-initialization phase is higher than that of the initialization phase.

According to a second aspect of the embodiments of the present invention, a data communication method is provided, comprising: acquiring memory data of a server from a communication bus in a receiver's communication protocol format, wherein the communication bus is connected between a memory pooling switch device and the server; performing verification preprocessing on the memory data to obtain verification preprocessed memory data, wherein the verification preprocessed memory data includes verification data of the memory data; transmitting the verification preprocessed memory data via the communication bus in the sender's communication protocol format, wherein a receiver's communication protocol format and the sender's communication protocol format are asymmetric communication protocols for the communication bus.

In another implementation of the present invention, the method further includes: performing verification processing on the verification preprocessed memory data to obtain a verification result; transmitting the verification result to the server via the communication bus in the sender's communication protocol format.

According to a third aspect of the embodiments of the present invention, a memory pooling switch device is provided, comprising: a processor, a memory, a communication interface, and an communication bus, wherein the processor, memory, and communication interface communicate with each other via the communication bus, and the communication interface communicates with the server via the communication bus; the memory is configured to store at least one executable instruction, which causes the processor to perform the operations corresponding to the methods as described in the first aspect or the second aspect.

According to a fourth aspect of the embodiments of the present invention, a cloud computing system is provided, comprising: a memory pooling switch device as described in the third aspect, and a plurality of servers, wherein the plurality of servers are connected to the memory pooling switch device via communication buses.

According to a fifth aspect of the embodiments of the present invention, a computer storage medium is provided, on which a computer program is stored. When executed by a processor, the program implements the methods as described in the first aspect or the second aspect.

In the embodiments of the present invention, the verification result sent to the server via the communication bus is obtained by performing verification processing on the verification preprocessed memory data. The verification preprocessed memory data is converted from the receiver's communication protocol format to the sender's communication protocol format (e.g., performed by a protocol conversion module of the memory pooling switch device). Additionally, the memory data of the server is acquired through the communication bus and sent for protocol conversion, such as by the protocol conversion module, after verification preprocessing. This achieves end-to-end protection for memory data transmission outside the server, thereby enhancing the reliability of data security protection.

BRIEF DESCRIPTION OF THE DRAWINGS

In order to more clearly illustrate the technical solutions in the embodiments of the present invention or the prior art, the drawings required for the description of the embodiments or the prior art will be briefly introduced below. The drawings described below are merely some embodiments of the present invention, and for those of ordinary skill in the art, other drawings can be obtained based on these drawings.

DETAIL DESCRIPTION OF THE EMBODIMENTS

To enable those skilled in the art to better understand the technical solutions in the embodiments of the present invention, the technical solutions in the embodiments of the present invention will be clearly and completely described below in conjunction with the accompanying drawings of the embodiments of the present invention. The described embodiments are only some of the embodiments of the present invention and not all embodiments. All other embodiments obtained by a person of ordinary skill in the art based on the embodiments of the present invention shall fall within the scope of protection of the embodiments of the present invention.

The following further illustrates the specific implementation of the embodiments of the present invention in conjunction with the accompanying drawings of the embodiments of the present invention.

Figure 1:
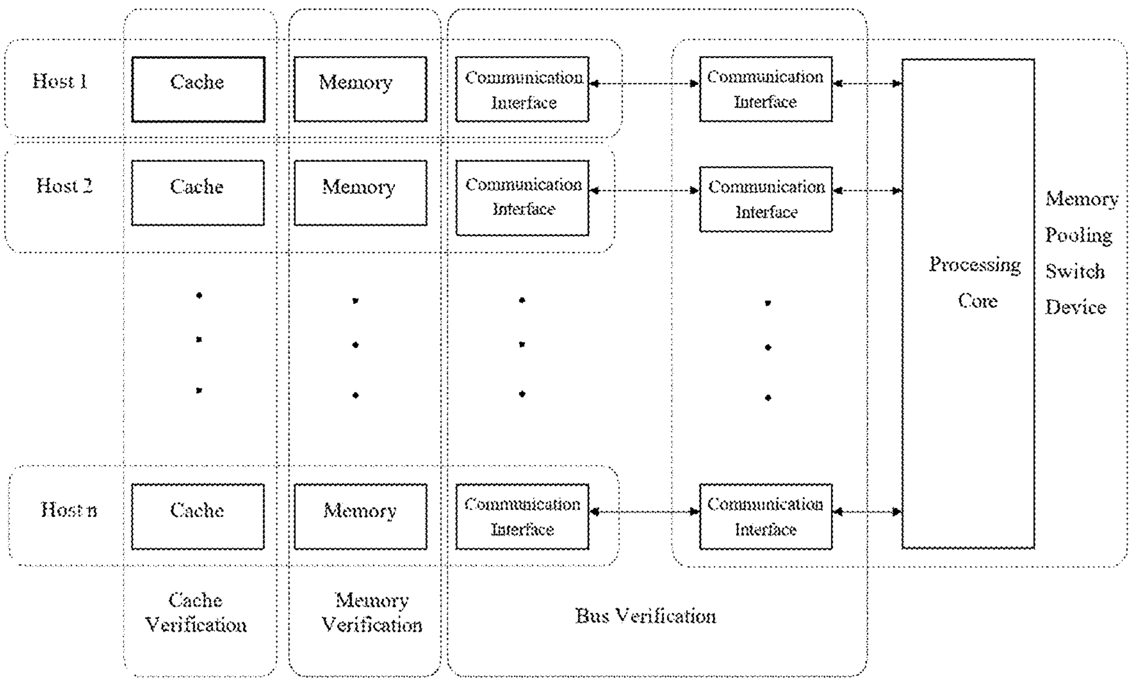
FIG. 1 is a schematic diagram of a cloud computing system according to an example.

A cloud computing system in FIG. 1 includes Host 1 to Host n, and a memory pooling switch device. Each host is connected through the memory pooling switch device. Each host can be connected to the corresponding memory pooling switch device. The hosts can be part of a host array in a server room, with each host in the host array being communicatively connected through the memory pooling switch device.

Each host includes a virtualization layer, a manager, and a resource scheduler. The virtualization layer is used to manage physical resources and divide them into multiple virtual machines. It is responsible for allocating computing resources, such as CPU, memory, and storage space, to meet user requests. The manager is used to manage the virtual machine resources on the host and dynamically adjust resource allocation based on user needs. It also monitors the host's status and performance to maintain system stability and high availability. The resource scheduler is responsible for optimizing the allocation and utilization of resources to ensure efficient use of system resources and maximize performance.

The memory pooling switch device is a key component in a cloud computing system for facilitating data transfer between hosts. Each host is interconnected through a high-speed network to enable rapid data transfer and communication. The memory pooling switch device can be a physical card or a virtual card, the latter typically implemented through software to support virtualized environments. The memory pooling switch device includes a bus interface, data transmission protocol capabilities, and routing capabilities. The bus interface is used to connect to the hosts. The data transmission protocol capabilities are used to achieve data transfer between hosts, ensuring data security and integrity. The routing capabilities are used to forward data packets to target hosts, ensuring the accuracy and efficiency of data transmission.

Each memory pooling switch device is interconnected to form a memory pooling switch network. The internal data security protection of the host includes cache verification for caches, memory verification for memory, and bus verification for the communication bus between the host and the memory pooling switch device. Various embodiments of the present invention provide a data security protection solution for data transmission between servers.

Figure 2:
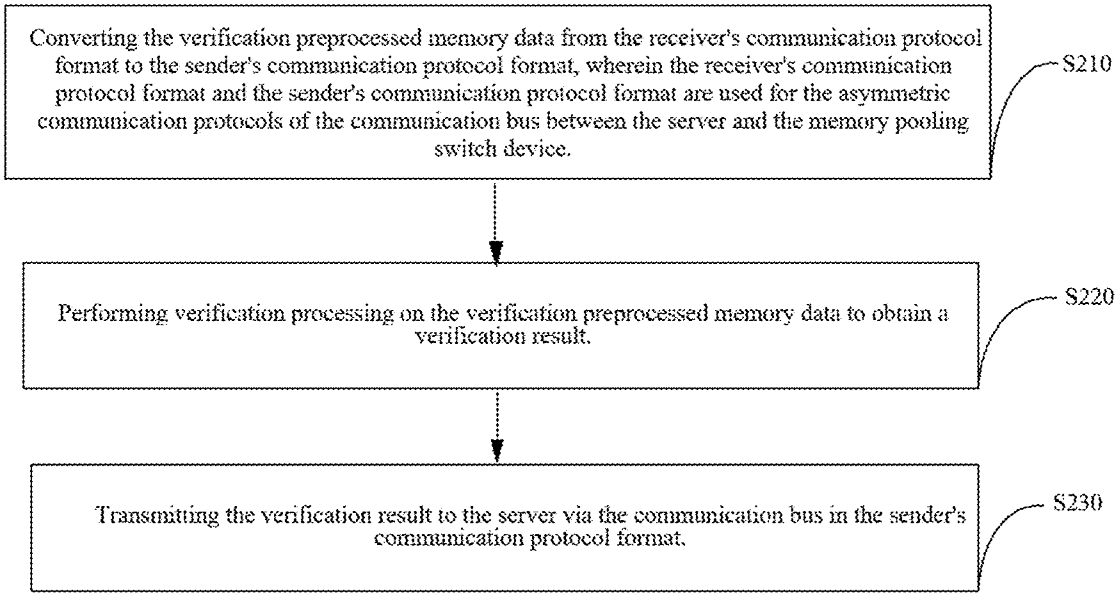
FIG. 2 is a flowchart of steps in a data communication method according to some embodiments of the present invention.

FIG. 2 illustrates a data communication method according to some embodiments of the present invention. The data communication method includes:

S210: converting the verification preprocessed memory data from the receiver's communication protocol format to the sender's communication protocol format, wherein the receiver's communication protocol format and the sender's communication protocol format are used for the asymmetric communication protocols of the communication bus between the server and the memory pooling switch device.

It should be understood that the memory pooling switch device can be an intelligent switch card, an expansion switch, or the like, such as a Smart Memory Expansion (SMX). The protocol conversion module is used for conversion between the receiver's communication protocol format and the sender's communication protocol format.

It should also be understood that verification preprocessing can process memory data using a verification algorithm to obtain verification data, and the memory data along with the verification data is used as the verification preprocessed memory data. The verification algorithms include, but are not limited to, parity check, Cyclic Redundancy Check (CRC), XOR check, etc.

S220: performing verification processing on the verification preprocessed memory data to obtain a verification result.

It should be understood that the verification processing can be based on a verification algorithm to verify the memory data and obtain a verification result. The verification result may include either a successful verification result or a failed verification result.

S230: transmitting the verification result to the server via the communication bus in the sender's communication protocol format.

It should be understood that the communication bus includes, but not limited to, PCIe bus, Ethernet, CXL bus, etc.

In the embodiments of the present invention, the verification result sent to the server via the communication bus is obtained by performing verification processing on the verification preprocessed memory data. The verification preprocessed memory data is converted from the receiver's communication protocol format to the sender's communication protocol format (e.g., performed by the protocol conversion module of the memory pooling switch device). Additionally, the server's memory data is acquired through the communication bus and sent for protocol conversion after verification preprocessing, such as by a protocol conversion module. This achieves end-to-end protection for memory data transmission outside the server, thereby enhancing the reliability of data security protection.

Figure 4:
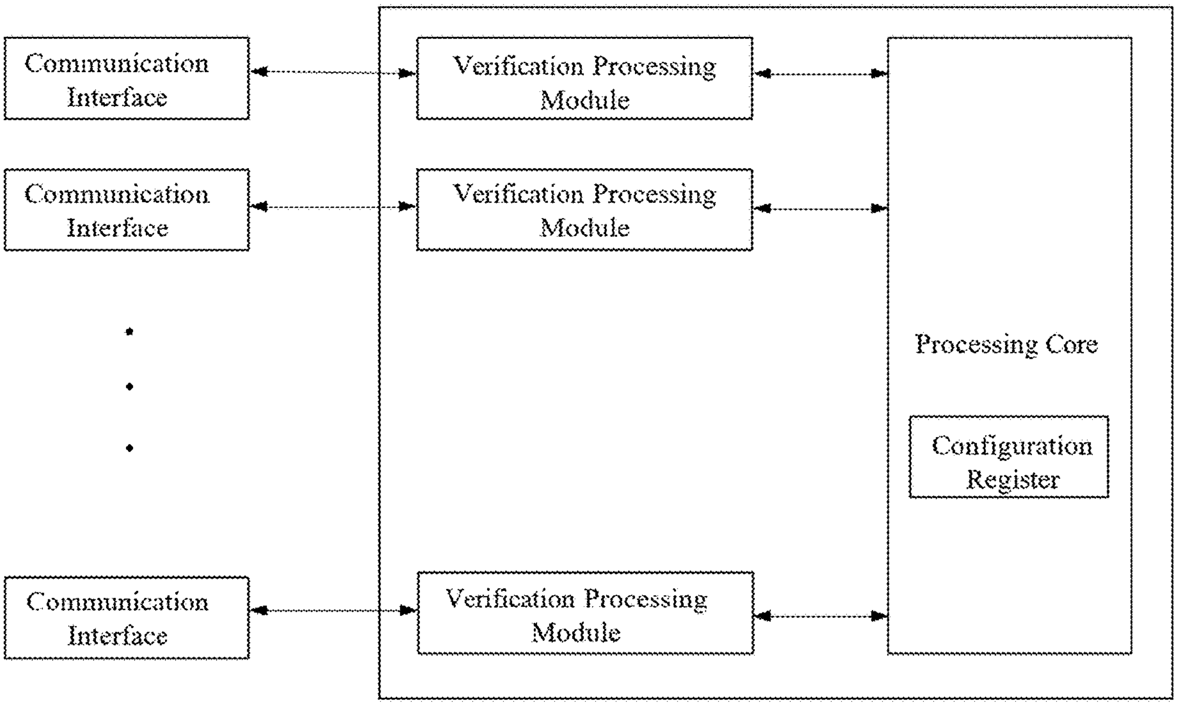
FIG. 4 is a schematic block diagram of a cloud computing system according to the embodiments of FIG. 2 or FIG. 3.

In some examples, as shown in FIG. 4, the verification processing module is configured within the memory pooling switch device, connected between the processing core of the memory pooling switch device and the communication bus interface that communicates with the host. It should be understood that the protocol conversion module is part of the processing core and is deployed inside the processing core, while the verification processing module is deployed outside the processing core. The communication protocol between the verification processing module and the processing core includes, but not limited to, Address Virtual Memory Management (AVMM) and Advanced extensible Interface (AXI). The processing core is used for the communication protocol between memory pooling switch devices, facilitating the transmission of memory data between different memory pooling switch devices to execute distributed computing or elastic computing among virtual machines in various servers within the cloud computing system.

The method in FIG. 2 can be executed by the verification processing module. Specifically, during the transmission of memory data by the memory pooling switch device, the verification processing module obtains the host's memory data via the communication bus that communicates with the host, and then performs verification preprocessing on the memory data, such as using a verification algorithm to generate verification data. The verification processing module can provide the memory data and verification data together to the processing core. The processing core generates a communication message with the communication protocol based on both the memory data and verification data for transmission. Additionally, the verification data can be stored in reserved fields (e.g., metadata fields) of the transmission message on the communication bus.

Accordingly, during the process of receiving memory data by the memory pooling switch device, the processing core parses the received communication message to obtain the verification preprocessed memory data. The verification processing module can then perform a verification on the verification preprocessed memory data to obtain the verification result.

For example, as an illustration of performing verification processing on the verification preprocessed memory data, the verification processing can be based on the memory data and the verification protection level corresponding to the system execution phase of the server. This results in the verification result. For instance, when the memory pooling switch device acquires memory data via the communication bus, it can read the preconfigured verification protection level from the memory data. The preconfigured verification protection level associates identifiers of the protection level with the memory data. The identifiers 0, 1, and 2 for the verification protection level represent low, medium, and high protection levels, respectively. Generally, the system execution phase of the server includes an initialization phase and a non-initialization phase, with the verification protection level of the non-initialization phase being higher than that of the initialization phase.

Alternatively, the processing core can also include configuration registers, which are used to store the verification protection levels of the memory data. Specifically, during the execution of the verification process, the verification processing module can read the verification protection level from the configuration registers of the processing core and then perform the verification processing based on the verification protection level. The following will describe various specific examples of the verification processing.

Furthermore, as an example of performing verification processing on the verification preprocessed memory data based on the verification protection level corresponding to the system execution phase of the server, if the memory data corresponds to the server's initialization phase, the verification preprocessed memory data is processed, and the obtained memory data is used as the verification result. For instance, if the identifier of the verification protection level indicates a low protection level (e.g., during the initialization phase of the cloud computing system), the obtained memory data is directly used as the verification result without checking whether the verification passes.

Alternatively, as an example of performing verification processing on the verification preprocessed memory data based on the verification protection level corresponding to the system execution phase of the server, if the memory data corresponds to a non-initialization phase of the server, the verification preprocessed memory data is processed. If the verification is successful, the obtained memory data and its verification data are used as the verification result. For instance, if the identifier of the verification protection level indicates a medium protection level (e.g., during the non-initialization phase of the cloud computing system), the obtained memory data and verification data are used as the verification result if the verification passes.

Furthermore, in the case that the verification fails, the memory data is corrected based on the verification data, and the corrected memory data and verification data are used as the verification result. For example, if the identifier of the verification protection level indicates a high protection level (e.g., during the non-initialization phase of the cloud computing system), the memory data is user data. In the case that the verification fails, the memory data is corrected, and the corrected memory data and verification data are used as the verification result. Alternatively, if the identifier of the verification protection level indicates a medium protection level (e.g., during the non-initialization phase of the cloud computing system), the memory data is system data. In the case that the verification fails, the memory data and verification data are returned to the server as the verification result, so that the server's operating system can perform the correction based on the memory data and verification data. User data requires higher security and accuracy compared to system data. Internal data security protection of the host includes cache verification for caches, memory verification for memory, and bus verification for the communication bus between the host and the memory pooling switch device. After error accumulation in the above parts, user data is also more difficult to recover than system data. Additionally, if memory data is not immediately corrected in the case that the verification fails, using the server's internal computing power releases the computational resources of the verification processing module, thereby improving data transmission efficiency.

Figure 3:
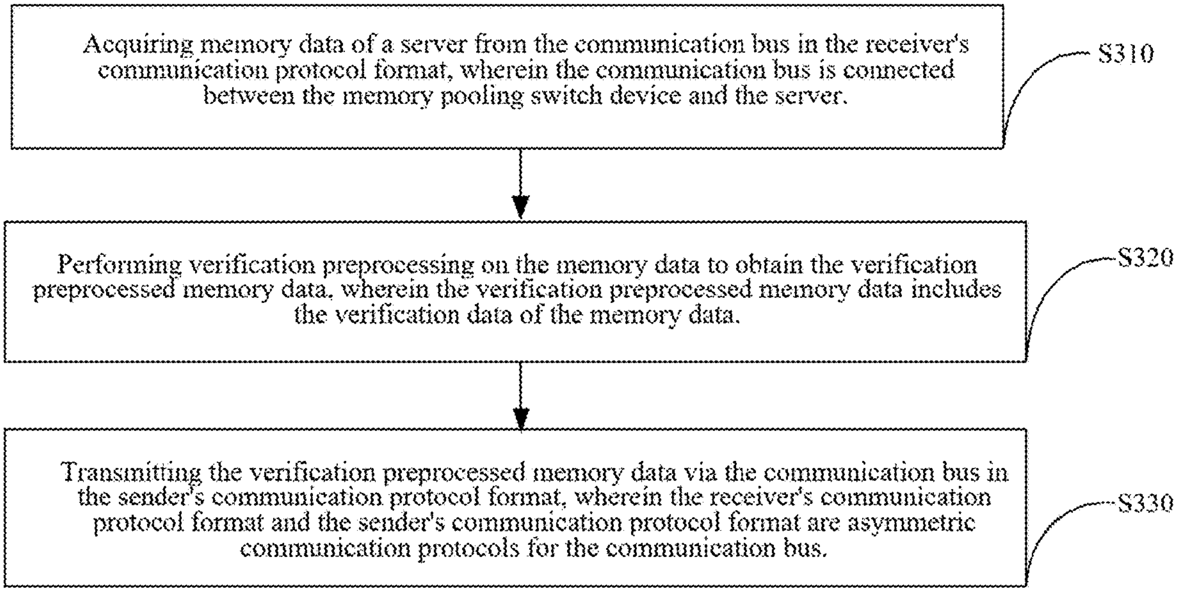
FIG. 3 is a flowchart of steps in a data communication method according to some embodiments of the present invention.

FIG. 3 illustrates a data communication method according to other embodiments of the present invention. The data communication method includes:

S310: acquiring memory data of a server from the communication bus in the receiver's communication protocol format, wherein the communication bus is connected between the memory pooling switch device and the server.

S320: performing verification preprocessing on the memory data to obtain the verification preprocessed memory data, wherein the verification preprocessed memory data includes the verification data of the memory data.

S330: transmitting the verification preprocessed memory data via the communication bus in the sender's communication protocol format, wherein the receiver's communication protocol format and the sender's communication protocol format are asymmetric communication protocols for the communication bus.

It should be understood that the memory pooling switch device can be an intelligent switch card, an expansion switch, or similar devices, such as a Smart Memory Expansion (SMX). The protocol conversion module is used for converting between the receiver's communication protocol format and the sender's communication protocol format.

It should also be understood that verification preprocessing can involve processing the memory data using a verification algorithm to obtain verification data. The memory data along with the verification data is used as the verification preprocessed memory data. The verification algorithms include, but are not limited to, parity check, Cyclic Redundancy Check (CRC), XOR check, etc.

It should also be understood that the memory data can be verified based on a verification algorithm to obtain a verification result. The verification result may include a verification-passed result or a verification-failed result.

It should also be understood that the communication bus includes, but not limited to, the PCIE bus, Ethernet, CXL bus, etc.

In this embodiment of the present invention, the verification result sent to the server via the communication bus is obtained by verifying the preprocessed memory data. The preprocessed memory data is converted from the receiver's communication protocol format to the sender's communication protocol format (for example, executed by the protocol conversion module of the memory pooling switch device). Additionally, the server's memory data is acquired through the communication bus and sent for protocol conversion, such as to a protocol conversion module, via verification preprocessing. Consequently, this achieves end-to-end protection of memory data during external transmission from the server, enhancing the reliability of data security protection.

In other examples, the data communication method further includes: converting the preprocessed memory data from the receiver's communication protocol format to the sender's communication protocol format, wherein the receiver's communication protocol format and the sender's communication protocol format are used for the asymmetric communication protocols of the communication bus between the server and the memory pooling switch device; verifying the preprocessed memory data to obtain the verification result; and sending the verification result to the server via the communication bus in the sender's communication protocol format. It should be understood that the steps and operations related to the data communication method of FIG. 2 are not elaborated in this embodiment.

As shown in FIG. 4, the verification processing module is configured within the memory pooling switch device and is connected between the processing core of the memory pooling switch device and the communication bus interface used for communication between the memory pooling switch device and the host. The processing core is used to transmit memory data between memory pooling switch devices via the communication protocol of the memory pooling switch devices, to perform distributed computing or elastic computing between virtual machines in various servers of the cloud computing system.

The method of FIG. 2 can be executed by the verification processing module. Specifically, during the process of the memory pooling switch device sending memory data, the verification processing module acquires the host's memory data via the communication bus that communicates with the host, and then performs verification preprocessing on the memory data, for instance, processing the memory data using a verification algorithm to obtain verification data. The verification processing module can provide the memory data and verification data together to the processing core. The processing core generates a communication message with the communication protocol based on the memory data and verification data together to perform the transmission. Additionally, the verification data can be stored in reserved fields (e.g., metadata fields of the transmission message) in the transmission message of the communication bus.

Accordingly, during the process of the memory pooling switch device receiving memory data, the processing core parses the received communication message to obtain the preprocessed memory data. The verification processing module can verify the preprocessed memory data to obtain the verification result.

Figure 5:
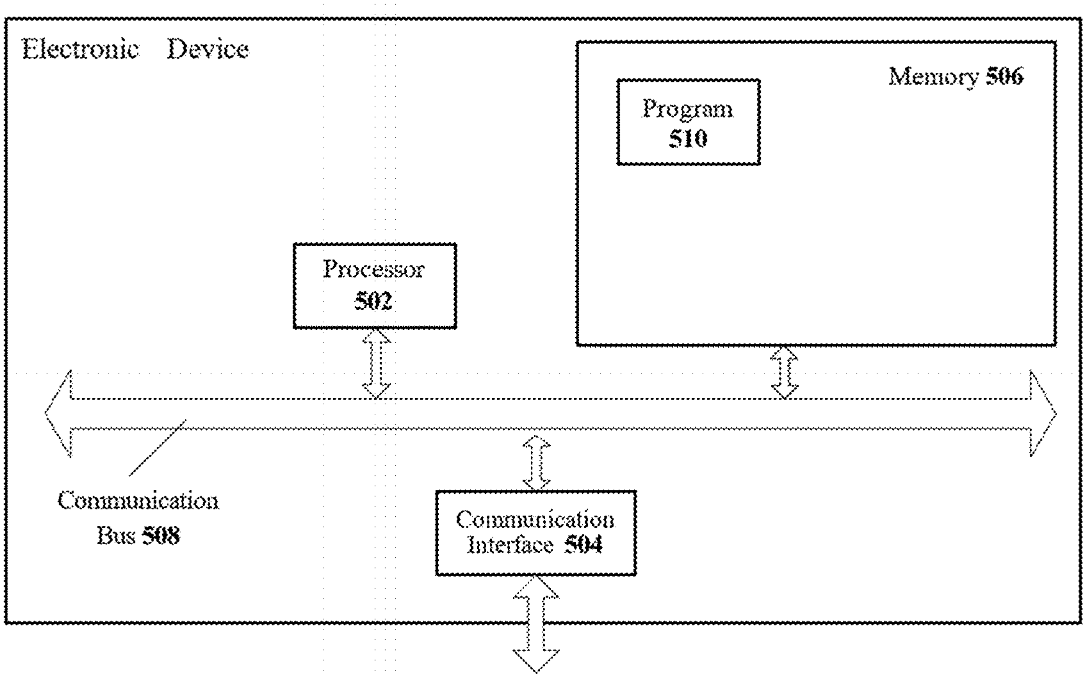
FIG. 5 is a schematic block diagram of an electronic device according to some embodiments of the present invention.

Referring to FIG. 5, a schematic structural diagram of a memory pooling switch device according to other embodiments of the present invention is shown. The specific embodiments of the present invention do not limit the specific implementation of the electronic device.

As shown in FIG. 5, the electronic device may include: a processor 502 for executing programs 510, a communications interface 504, a memory 506, and an communication bus 508.

The processor, communications interface, and memory communicate with each other through the communication bus.

The communications interface is used for communicating with the server via the communication bus.

The processor is used for executing programs, performing the relevant steps in the above-described method embodiments.

Specifically, the program may include program code, which includes computer operation instructions.

The processor may be a CPU, or an Application Specific Integrated Circuit (ASIC), or one or more integrated circuits configured to implement one or more embodiments of the present invention. The smart device may include one or more processors, which can be of the same type, such as one or more CPUs, or of different types, such as one or more CPUs and one or more ASICs.

The memory is used for storing programs. The memory may include high-speed RAM and may also include non-volatile memory, such as at least one disk storage.

The program may include multiple computer instructions, enabling the processor to execute the following through these instructions: convert the preprocessed memory data from the receiver's communication protocol format to the sender's communication protocol format, where the receiver's communication protocol format and the sender's communication protocol format are used for the asymmetric communication protocol of the communication bus between the server and the memory pooling switch device. Perform verification processing on the preprocessed memory data to obtain a verification result. Send the verification result to the server via the communication bus in the sender's communication protocol format.

Alternatively, acquire the server's memory data from the communication bus in the receiver's communication protocol format, where the communication bus is connected between the memory pooling switch device and the server. Perform verification preprocessing on the memory data to obtain preprocessed memory data, where the preprocessed memory data includes verification data of the memory data. Send the preprocessed memory data via the communication bus in the sender's communication protocol format, where the receiver's communication protocol format and the sender's communication protocol format are the asymmetric communication protocols of the communication bus.

The specific implementation of each step in the program can refer to the corresponding descriptions in the respective steps and units of the above method embodiments and possesses the corresponding beneficial effects, which are not reiterated here. Those skilled in the art can clearly understand that, for the sake of convenience and brevity in description, the specific working processes of the aforementioned described devices and modules can be referred to in the corresponding process descriptions in the preceding method embodiments, which are not reiterated here.

The embodiments of the present invention also provides a computer storage medium on which a computer program is stored. When executed by a processor, the program implements the method described in any of the aforementioned method embodiments. The computer storage medium includes, but is not limited to, Compact Disc Read-Only Memory (CD-ROM), Random Access Memory (RAM), floppy disks, hard disks, or magneto-optical disks.

Additionally, it should be noted that any user-related information (including but not limited to user device information, personal information, etc.) and data (including but not limited to cloud task data processed by the processor, stored data, displayed data, etc.) involved in the embodiments of the present invention are authorized by the user or fully authorized by all parties. The collection, use, and processing of such data must comply with the relevant laws, regulations, and standards of the respective countries and regions. Furthermore, appropriate mechanisms are provided to allow users to choose to authorize or deny the use of their information and data.

It should be noted that, as needed for implementation, the various components/steps described in the embodiments of the present invention can be split into more components/steps. Additionally, two or more components/steps, or parts of the operations of the components/steps, can be combined into new components/steps to achieve the objectives of the embodiments of the present invention.

The methods according to the embodiments of the present invention can be implemented in hardware, firmware, or as software or computer code stored on a recording medium (such as CD-ROM, RAM, floppy disk, hard disk, or magneto-optical disk). Alternatively, they can be realized as computer code initially stored in remote recording media or non-transitory machine-readable media and downloaded over a network to be stored in local recording media. Thus, the described methods can be stored on such recording media using general-purpose computers, dedicated processors, or programmable or dedicated hardware (such as Application Specific Integrated Circuits (ASICs) or Field Programmable Gate Arrays (FPGAs)). It is understood that a computer, processor, microprocessor controller, or programmable hardware includes storage components (such as Random Access Memory (RAM), Read-Only Memory (ROM), flash memory, etc.) that can store or receive software or computer code. When this software or computer code is accessed and executed by the computer, processor, or hardware, it implements the methods described herein. Furthermore, when a general-purpose computer accesses code designed to implement the methods shown here, the execution of the code transforms the general-purpose computer into a specialized computer for executing the methods illustrated.

It will be appreciated by those skilled in the art that the units and method steps of the various examples described in connection with the embodiments disclosed herein can be implemented in electronic hardware, or a combination of computer software and electronic hardware. Whether these functions are executed as hardware or software depends on the specific application and design constraints of the technical solution. Skilled professionals may use different methods to implement the described functions for specific applications, but such implementations should not be considered as going beyond the scope of the embodiments of the present invention.

The above embodiments are merely illustrative of the embodiment of the present invention and are not intended to limit the scope of the invention. Those skilled in the relevant technical field can make various changes and modifications without departing from the spirit and scope of the embodiments of the present invention. Therefore, all equivalent technical solutions should also be considered within the scope of the embodiments of the present invention. The scope of patent protection for the embodiments of the present invention should be defined by the claims.

What is claimed is:

1. A data communication method performed by a memory pooling switch device connected to a server for asymmetric communication protocols via a communication bus, comprising:

receiving verification preprocessed memory data, wherein the verification preprocessed memory data comprises memory data and associated verification data;

converting the verification preprocessed memory data from a receiver's communication protocol format to a sender's communication protocol format, wherein the receiver's communication protocol format is used by the memory pooling switch device to receive data, and the sender's communication protocol format is compatible with the communication bus for transmission to the server;

performing verification processing on the verification preprocessed memory data by verifying the memory data using the verification data to obtain a verification result;

transmitting the verification result to the server via the communication bus in the sender's communication protocol format.

2. The method according to claim 1, wherein the performing verification processing on the verification preprocessed memory data to obtain a verification result comprises:

performing verification processing on the verification preprocessed memory data based on the memory data and a verification protection level corresponding to a system execution phase of the server, to obtain the verification result.

3. The method according to claim 2, wherein the performing verification processing on the verification preprocessed memory data based on the memory data and a verification protection level corresponding to a system execution phase of the server, to obtain the verification result comprises:

if the system execution phase of the server is in an initialization phase of the server, performing verification processing on the verification preprocessed memory data, and using the obtained memory data as the verification result.

4. The method according to claim 2, wherein the performing verification processing on the verification preprocessed memory data based on the memory data and a verification protection level corresponding to a system execution phase of the server, to obtain the verification result comprises:

if the system execution phase of the server is in a non-initialization phase of the server, performing verification processing on the verification preprocessed memory data, and if the verification is successful, using the obtained memory data and its verification data as the verification result.

5. The method according to claim 4, wherein the performing verification processing on the verification preprocessed memory data based on the memory data and a verification protection level corresponding to a system execution phase of the server, to obtain the verification result further comprises:

if the verification fails, correcting the memory data based on the verification data;

using the corrected memory data and the verification data as the verification result.

6. The method according to claim 2, wherein the system execution phase of the server comprises an initialization phase and a non-initialization phase, and the verification protection level of the non-initialization phase is higher than the verification protection level of the initialization phase.

7. A memory pooling switch device, comprising: a processor, a memory, a communication interface, and a communication bus, wherein the communication interface communicates with a server via the communication bus, and the memory has instructions stored thereon that are executable by the processor to perform one or more operations comprising:

receiving verification preprocessed memory data, wherein the verification preprocessed memory data comprises memory data and associated verification data;

converting the verification preprocessed memory data from a receiver's communication protocol format to a sender's communication protocol format, wherein the receiver's communication protocol format is used by the memory pooling switch device to receive data, and the sender's communication protocol format is compatible with the communication bus for transmission to the server;

performing verification processing on the verification preprocessed memory data by verifying the memory data using the verification data to obtain a verification result;

transmitting the verification result to the server via the communication bus in the sender's communication protocol format.

8. The memory pooling switch device according to claim 7, wherein the performing verification processing on the verification preprocessed memory data to obtain a verification result comprises:

performing verification processing on the verification preprocessed memory data based on the memory data and a verification protection level corresponding to a system execution phase of the server, to obtain the verification result.

9. The memory pooling switch device according to claim 8, wherein the performing verification processing on the verification preprocessed memory data based on the memory data and a verification protection level corresponding to a system execution phase of the server, to obtain the verification result comprises:

if the system execution phase of the server is in an initialization phase of the server, performing verification processing on the verification preprocessed memory data, and using the obtained memory data as the verification result.

10. The memory pooling switch device according to claim 8, wherein the performing verification processing on the verification preprocessed memory data based on the memory data and a verification protection level corresponding to a system execution phase of the server, to obtain the verification result comprises:

if the system execution phase of the server is in a non-initialization phase of the server, performing verification processing on the verification preprocessed memory data, and if the verification is successful, using the obtained memory data and its verification data as the verification result.

11. The memory pooling switch device according to claim 10, wherein the performing verification processing on the verification preprocessed memory data based on the memory data and a verification protection level corresponding to a system execution phase of the server, to obtain the verification result further comprises:

if the verification fails, correcting the memory data based on the verification data;

using the corrected memory data and the verification data as the verification result.

12. The memory pooling switch device according to claim 8, wherein the system execution phase of the server comprises an initialization phase and a non-initialization phase, and the verification protection level of the non-initialization phase is higher than the verification protection level of the initialization phase.

* * * * *